United States Patent
Kunzler et al.

(10) Patent No.: US 10,605,316 B2
(45) Date of Patent: *Mar. 31, 2020

(54) BRAKING DEVICE, SYSTEM AND METHOD

(71) Applicants: Peter C. Kunzler, Issaquah, WA (US); Gary R. McLuen, Port Townsend, WA (US); Daniel R. Baker, Seattle, WA (US)

(72) Inventors: Alex E. Kunzler, LaQuinta, CA (US); Peter C. Kunzler, Issaquah, WA (US); Gary R. McLuen, Port Townsend, WA (US); Daniel R. Baker, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,863

(22) Filed: Jan. 5, 2018

(65) Prior Publication Data

US 2018/0128330 A1 May 10, 2018

Related U.S. Application Data

(63) Continuation of application No. 15/586,188, filed on May 3, 2017, now Pat. No. 9,885,396, which is a (Continued)

(51) Int. Cl.
*F16D 65/00* (2006.01)
*B60T 1/06* (2006.01)

(52) U.S. Cl.
CPC .......... *F16D 65/0031* (2013.01); *B60T 1/065* (2013.01); *F16D 65/0081* (2013.01); *Y10T 29/49826* (2015.01)

(58) Field of Classification Search
CPC ... F16D 65/0031; F16D 65/0081; B60T 1/065
See application file for complete search history.

(56) References Cited

U.S. PATENT DOCUMENTS 5,162,053 A 11/1992 Kowalksi
5,746,294 A 5/1998 Lee
(Continued)

FOREIGN PATENT DOCUMENTS

EP 2522876 A1 11/2012
JP 2012506517 3/2012
(Continued)

OTHER PUBLICATIONS

SAE J2430 Nov. 2012 Surface Vehicle Standard, Aug. 1999.
(Continued)

*Primary Examiner* — Vishal R Sahni
(74) *Attorney, Agent, or Firm* — Haverstock & Owens LLP

(57) ABSTRACT

A braking system for safely collecting brake dust produced by operation of a braking mechanism. The braking system comprises a collector apparatus coupled with a braking mechanism. The collector apparatus is able to include a shroud that surrounds the braking mechanism and a catch element coupled with the shroud for collecting brake dust exiting the shroud. As a result, when coupled with the braking mechanism, the collector apparatus is able to ensure that most or all brake dust, such as copper or other particles from the braking mechanism that break off from the braking mechanism during operation of the braking mechanism, are removed from the braking mechanism and collected by the filter/catch of the collector mechanism.

35 Claims, 9 Drawing Sheets

Related U.S. Application Data continuation of application No. 14/213,656, filed on Mar. 14, 2014, now Pat. No. 9,677,627.

(60) Provisional application No. 61/798,588, filed on Mar. 15, 2013.

(56) References Cited

U.S. PATENT DOCUMENTS

| | | | |
|---|---|---|---|
| 6,592,642 B2* | 7/2003 | Maricq | F16D 65/00 |
| | | | 188/218 A |
| 7,094,268 B2 | 8/2006 | Krantz | |
| 7,963,376 B2 | 6/2011 | Gelb | |
| 8,191,691 B2* | 6/2012 | Gelb | F16D 65/847 |
| | | | 188/264 AA |
| 8,926,738 B2* | 1/2015 | Lupica | B03C 1/0332 |
| | | | 188/218 A |
| 9,677,627 B2* | 6/2017 | Kunzler | F16D 65/0031 |
| 9,885,396 B2 | 2/2018 | Kunzler et al. | |
| 2002/0166311 A1 | 11/2002 | Maricq et al. | |
| 2005/0126868 A1 | 6/2005 | Lee | |
| 2008/0029357 A1* | 2/2008 | Krantz | B60L 11/123 |
| | | | 188/218 A |
| 2010/0096226 A1 | 4/2010 | Gelb | |
| 2010/0301785 A1* | 12/2010 | Davis | B60T 13/04 |
| | | | 318/365 |
| 2011/0214568 A1* | 9/2011 | Krantz | F16D 65/0031 |
| | | | 95/273 |
| 2012/0091832 A1 | 4/2012 | Soderberg | |
| 2014/0262633 A1* | 9/2014 | Kunzler | F16D 65/0031 |
| | | | 188/72.1 |
| 2017/0234381 A1 | 8/2017 | Kunzler et al. | |

FOREIGN PATENT DOCUMENTS

| | | |
|---|---|---|
| WO | 2005091838 A2 | 10/2005 |
| WO | 2010048089 A2 | 4/2010 |
| WO | 2014144620 A2 | 9/2014 |

OTHER PUBLICATIONS

Peter Filip, Automotice Brake Wear Debris, Center for Advanced Fiction Studies, Southern Illinois University Carbondale, BMC meeting, Naples, Florida, Jun. 5, 2009.

Jana Kukutschova et al., On Airborne Nano/Micro-sized Particles Released from Low-metallic Automotive Brakes, Southern Illinois University Carbondale.

Ashley Haselden et al., Characterization of Airborne Brake Wear Debris, Final Report, Submitted to Association of Bay Area Government, Jan. 2006.

Jana Kukutschova, Wear performance and wear debris of semi-metalic automotive brake materials, Wear, vol. 268, pp. 86-93, 2010.

Mark A. Schlautman et al., Brake Pad Wear Debris Characterization, School of the Environment, Clemson University.

* cited by examiner

BRAKING DEVICE, SYSTEM AND METHOD

RELATED APPLICATIONS

This Application is a continuation application of co-pending U.S. patent application Ser. No. 15/586,188, filed on May 3, 2017, and entitled "BRAKING DEVICE, SYSTEM AND METHOD," which is a continuation of U.S. patent application Ser. No. 14/213,656, filed on Mar. 14, 2014, and entitled "BRAKING DEVICE, SYSTEM AND METHOD," which claims priority under 35 U.S.C. 119 (e) of the co-pending U.S. Provisional Application Ser. No. 61/798,588, filed Mar. 15, 2013, and entitled "A BRAKING DEVICE, SYSTEM AND METHOD," which are all hereby incorporated by reference.

FIELD OF THE INVENTION

The invention relates to the field of brakes. In particular, the invention relates to devices, systems and methods for collecting brake dust.

BACKGROUND OF THE INVENTION

Currently, every time the brakes on a vehicle are used they are polluting the environment by releasing "brake dust" in the form of particles from the brake pads and/or brake mechanism. Specifically, brake pads can contain up to 15% copper which is released into the environment as the pads slowly break down each time they are used. Studies have shown that about 190,000 pounds of brake pad copper ends up in San Francisco bay every year equaling 36% of the total copper pollution. Indeed, particulate matter is one of the top six common pollutants according to the U.S. Environmental Protection Agency. This brake dust pollution can damage human lungs as well as harm the environment, for example, by disrupting salmon's ability to smell and avoid predators.

SUMMARY OF THE INVENTION

Embodiments of the invention are directed to a braking system for safely collecting brake dust produced by operation of a braking mechanism. The braking system comprises a collector apparatus coupled with a braking mechanism. The collector apparatus is able to include a shroud that surrounds the braking mechanism and a catch element coupled with the shroud for collecting brake dust exiting the shroud. As a result, when coupled with the braking mechanism, the collector apparatus is able to ensure that most or all brake dust, such as copper or other particles from the braking mechanism that break off from the breaking mechanism during operation of the braking mechanism, are removed from the braking mechanism and collected by the filter/catch of the collector mechanism. This provides the benefit of preventing the brake dust from disturbing operation of the brake mechanism or operation of components coupled to the brake mechanism, as well as preventing the brake dust from polluting the area/environment surrounding the braking system.

A first aspect is directed to a braking apparatus for collecting brake dust caused by braking a vehicle. The braking apparatus comprises a braking mechanism having one or more brake pads, a shroud coupled with the braking mechanism and forming a hollow cavity having a shroud inlet aperture and a shroud outlet aperture and a hollow catch canister having an air filter, a catch inlet aperture and a catch outlet aperture and coupled with the shroud such that the shroud outlet aperture aligns with the catch inlet aperture, wherein the air filter blocks the path between the catch inlet aperture and the catch outlet aperture through the catch canister. In some embodiments, the braking mechanism comprises one or more calipers, a rotor and a hub, wherein the calipers are fixedly coupled with the shroud whereas the rotor and hub are both rotatably coupled with the shroud such that the rotor and the hub are able to rotate with respect with the shroud. In some embodiments, the cavity is structured to fit around the rotor of the braking mechanism and the shroud comprises one or more caliper apertures and one or more hub apertures sized to receive the calipers and the hub of the braking mechanism. In some embodiments, inner walls of the shroud forming the cavity comprise one or more of the group consisting of air tunnels and air fins that guide the air along a desired route. In some embodiments, the shroud inlet aperture faces away from the catch inlet aperture. In some embodiments, the catch outlet aperture faces toward the catch inlet aperture. In some embodiments, the apparatus further comprises an electrostatic precipitator having one or more plates, one or more electrodes and a power source that maintains a voltage difference between the plates and the electrodes. In some embodiments, the electrostatic precipitator is positioned within the hollow cavity of the shroud such that the electrodes are between the plates and the shroud inlet aperture. In some embodiments, the catch inlet aperture is positioned below the plates to catch brake dust that falls off the plates. In some embodiments, the apparatus further comprises a magnetic braking element having a magnetic field generator and a controller, wherein the magnetic braking element is positioned within the hollow cavity near the braking mechanism and produces a magnetic field oriented such that the field resists the rotation of the rotor of the braking mechanism in a first direction. In some embodiments, the controller is configured to adjust the strength, position relative to the braking mechanism and/or orientation of the magnetic field produced by the magnetic field generator based on received control signals.

A second aspect is directed to a brake dust collector for coupling with a braking mechanism and collecting brake dust caused by braking a vehicle. The brake dust collector comprises a shroud forming a hollow cavity having a shroud inlet aperture and a shroud outlet aperture and a hollow catch canister having an air filter, a catch inlet aperture and a catch outlet aperture and coupled with the shroud such that the shroud outlet aperture aligns with the catch inlet aperture, wherein the air filter blocks the path between the catch inlet aperture and the catch outlet aperture through the catch canister. In some embodiments, the cavity is structured to fit around a rotor of the braking mechanism and the shroud comprises one or more caliper apertures and one or more hub apertures sized to receive a caliper and a hub of the braking mechanism. In some embodiments, inner walls of the shroud forming the cavity comprise one or more of the group consisting of air tunnels and air fins that guide the air along a desired route. In some embodiments, the shroud inlet aperture faces away from the catch inlet aperture. In some embodiments, the catch outlet aperture faces toward the catch inlet aperture. In some embodiments, the collector further comprises an electrostatic precipitator having one or more plates, one or more electrodes and a power source that maintains a voltage difference between the plates and the electrodes. In some embodiments, the electrostatic precipitator is positioned within the hollow cavity of the shroud such that the electrodes are between the plates and the shroud inlet aperture. In some embodiments, the catch inlet aperture is positioned below the plates to catch brake dust that falls off the plates. In some embodiments, the collector further comprises a magnetic braking element having a magnetic field generator and a controller, wherein the magnetic braking element is positioned within the hollow cavity near the braking mechanism and produces a magnetic field oriented such that the field resists the rotation of a rotor of the braking mechanism. In some embodiments, the controller is configured to adjust the strength, position relative to the braking mechanism and/or orientation of the magnetic field produced by the magnetic field generator based on received control signals.

A third aspect is directed to a method of providing a braking apparatus. The method comprises coupling a shroud with a braking mechanism having one or more brake pads by positioning the braking mechanism at least partially within a hollow cavity formed by the shroud, wherein the shroud has a shroud inlet aperture and a shroud outlet aperture and coupling a hollow catch canister with the shroud, wherein the hollow catch canister comprises an air filter, a catch inlet aperture and a catch outlet aperture and is coupled with the shroud such that the shroud outlet aperture aligns with the catch inlet aperture, wherein the air filter blocks the path between the catch inlet aperture and the catch outlet aperture through the catch canister. In some embodiments, the braking mechanism comprises one or more calipers, a rotor and a hub, wherein the calipers are fixedly coupled with the shroud whereas the rotor and hub are both rotatably coupled with the shroud such that the rotor and the hub are able to rotate with respect with the shroud. In some embodiments, the cavity is structured to fit around the rotor of the braking mechanism and the shroud comprises one or more caliper apertures and one or more hub apertures sized to receive the calipers and the hub of the braking mechanism. In some embodiments, inner walls of the shroud forming the cavity comprise one or more of the group consisting of air tunnels and air fins that guide the air along a desired route. In some embodiments, the shroud inlet aperture faces away from the catch inlet aperture. In some embodiments, the catch outlet aperture faces toward the catch inlet aperture. In some embodiments, the method further comprises coupling an electrostatic precipitator with the shroud, wherein the electrostatic precipitator has one or more plates, one or more electrodes and a power source that maintains a voltage difference between the plates and the electrodes. In some embodiments, the electrostatic precipitator is positioned within the hollow cavity of the shroud such that the electrodes are between the plates and the shroud inlet aperture. In some embodiments, the catch inlet aperture is positioned below the plates to catch brake dust that falls off the plates. In some embodiments, the method further comprises coupling a magnetic braking element with the shroud, wherein the magnetic braking element has a magnetic field generator and a controller and is positioned within the hollow cavity near the braking mechanism, and further wherein the magnetic field generator produces a magnetic field oriented such that the field resists the rotation of the rotor of the braking mechanism in a first direction. In some embodiments, the controller is configured to adjust the strength, position relative to the braking mechanism and/or orientation of the magnetic field produced by the magnetic field generator based on received control signals.

A fourth aspect is directed to a braking apparatus for collecting brake dust caused by braking a vehicle. The braking apparatus comprises a braking mechanism having one or more brake pads and a dust collector coupled with the braking mechanism and including a hollow cylindrical housing coupled with a hollow dust canister, the hollow cylindrical housing forming a vortex chamber and comprising an outlet aperture positioned in the center of the ceiling of the vortex chamber which includes a downwardly spiraling ramp around the perimeter of the outlet aperture, a main inlet aperture positioned on the perimeter of the vortex chamber at the top of the ramp and a dust inlet aperture positioned on the perimeter of the vortex chamber lower than the main inlet aperture and a reversal plate positioned in the center of the floor of the vortex chamber for redirecting air entering the main inlet aperture and passing the dust inlet aperture up though the center of the vortex chamber and out the outlet aperture. In some embodiments, the hollow dust canister is coupled to the floor of the vortex chamber, and further wherein the floor of the vortex chamber comprises one or more interface apertures that provide a pathway from the vortex chamber into a dust chamber within the dust canister. In some embodiments, the interface apertures are positioned under the reversal plate. In some embodiments, the cylindrical housing comprises a tube that extends downward from the perimeter of the outlet aperture into the vortex chamber. In some embodiments, the reversal plate comprises a convex surface that faces the outlet aperture. In some embodiments, the main inlet aperture forms a funnel that funnels air into the vortex chamber and directs the air down the downwardly spiraling ramp. In some embodiments, the inner walls of the cylindrical housing comprise one or more pillars that protrude inward from the inner walls. In some embodiments, the pillars are porous such that the pillars filter brake dust from the air passing through the pillars. In some embodiments, the pillars are movably attached to the inner walls of the cylindrical housing via a fulcrum such that the pillars are able to rotate about the fulcrum.

A fifth aspect is directed to a brake dust collector for coupling with a braking mechanism and collecting brake dust caused by braking a vehicle. The brake dust collector comprises a hollow dust canister and a hollow cylindrical housing coupled with the hollow dust canister and forming a vortex chamber, wherein the hollow cylindrical housing comprises an outlet aperture positioned in the center of the ceiling of the vortex chamber which includes a downwardly spiraling ramp around the perimeter of the outlet aperture, a main inlet aperture positioned on the perimeter of the vortex chamber at the top of the ramp and a dust inlet aperture positioned on the perimeter of the vortex chamber lower than the main inlet aperture, and a reversal plate positioned in the center of the floor of the vortex chamber for redirecting air entering the main inlet aperture and passing the dust inlet aperture up though the center of the vortex chamber and out the outlet aperture. In some embodiments, the hollow dust canister is coupled to the floor of the vortex chamber, and further wherein the floor of the vortex chamber comprises one or more interface apertures that provide a pathway from the vortex chamber into a dust chamber within the dust canister. In some embodiments, the interface apertures are positioned under the reversal plate. In some embodiments, the cylindrical housing comprises a tube that extends downward from the perimeter of the outlet aperture into the vortex chamber. In some embodiments, the reversal plate comprises a convex surface that faces the outlet aperture. In some embodiments, the main inlet aperture forms a funnel that funnels air into the vortex chamber and directs the air down the downwardly spiraling ramp. In some embodiments, the inner walls of the cylindrical housing comprise one or more pillars that protrude inward from the inner walls. In some embodiments, the pillars are porous such that the pillars filter brake dust from the air passing through the pillars. In some embodiments, the pillars are movably attached to the inner walls of the cylindrical housing via a fulcrum such that the pillars are able to rotate about the fulcrum.

A sixth aspect is directed to a method of providing a braking apparatus. The method comprises providing a braking mechanism including one or more brake pads, providing a brake dust collector, the brake dust collector comprising a hollow dust canister and a hollow cylindrical housing coupled with the hollow dust canister and forming a vortex chamber, wherein the hollow cylindrical housing comprises an outlet aperture positioned in the center of the ceiling of the vortex chamber which includes a downwardly spiraling ramp around the perimeter of the outlet aperture, a main inlet aperture positioned on the perimeter of the vortex chamber at the top of the ramp and a dust inlet aperture positioned on the perimeter of the vortex chamber lower than the main inlet aperture, and a reversal plate positioned in the center of the floor of the vortex chamber for redirecting air entering the main inlet aperture and passing the dust inlet aperture up though the center of the vortex chamber and out the outlet aperture and coupling the dust collector to the braking mechanism such that the dust inlet aperture faces the braking mechanism. In some embodiments, the hollow dust canister is coupled to the floor of the vortex chamber, and further wherein the floor of the vortex chamber comprises one or more interface apertures that provide a pathway from the vortex chamber into a dust chamber within the dust canister. In some embodiments, the interface apertures are positioned under the reversal plate. In some embodiments, the cylindrical housing comprises a tube that extends downward from the perimeter of the outlet aperture into the vortex chamber. In some embodiments, the reversal plate comprises a convex surface that faces the outlet aperture. In some embodiments, the main inlet aperture forms a funnel that funnels air into the vortex chamber and directs the air down the downwardly spiraling ramp. In some embodiments, the inner walls of the cylindrical housing comprise one or more pillars that protrude inward from the inner walls. In some embodiments, the pillars are porous such that the pillars filter brake dust from the air passing through the pillars. In some embodiments, the pillars are movably attached to the inner walls of the cylindrical housing via a fulcrum such that the pillars are able to rotate about the fulcrum.

DETAILED DESCRIPTION OF THE PRESENT INVENTION

Embodiments of the braking device, system and method described herein are directed to a braking system wherein brake dust produced by the brake pads (e.g. through friction/interaction with an opposing braking surface) and other particles are collected by a collector apparatus coupled to the braking mechanism. In particular, the collector apparatus is able to suction, filter, ionize, stick, adhere, embed or otherwise collect brake dust from the brake mechanism such that the brake dust can be properly disposed of instead of released into the environment. As a result, the system provides the advantages of maintaining a cleaner brake mechanism and device utilizing the brake mechanism as well as a cleaner external environment around the device utilizing the brake mechanism. Indeed, this is able to result in better brake performance due to cleaner brake components. Additionally, the system provides the advantage of recovering the brake dust such that the brake dust then able to be recycled Further, the system provides the advantage of increasing cooling of the braking mechanism during operation. Additionally, although the description below is in relation to a rotary brake mechanism for a vehicle, the braking system is able to be configured for any device that utilizing a friction braking mechanism (linear or rotary) that produces particulate matter.

Figure 1:
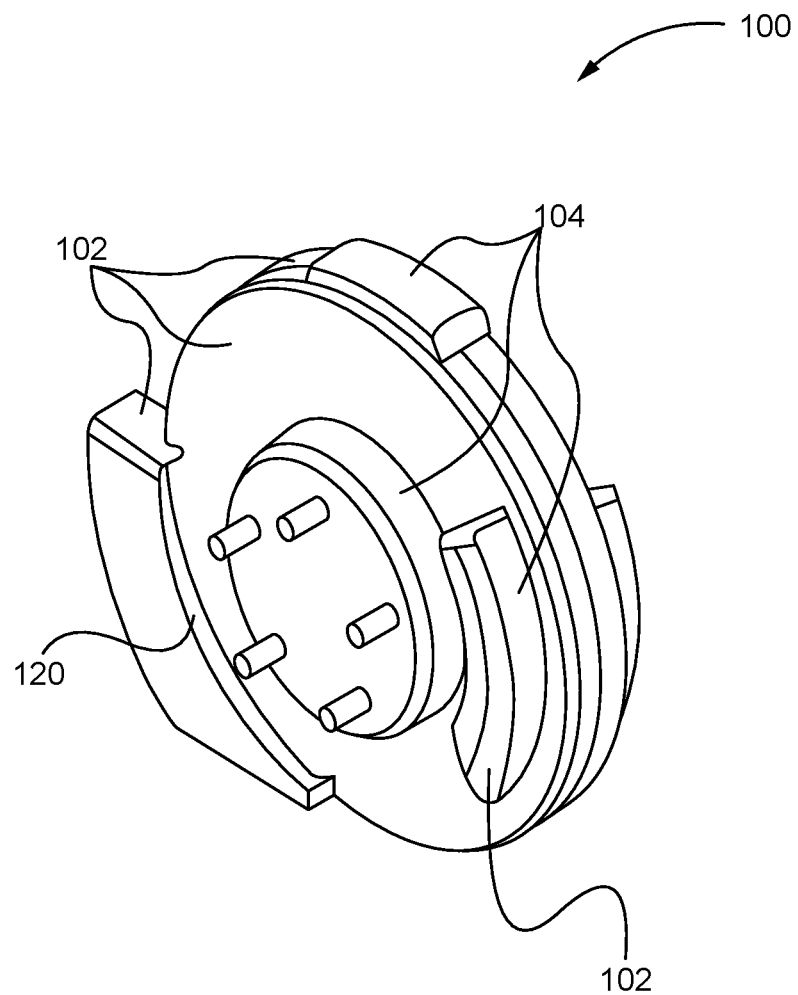
FIG. 1 illustrates a perspective view of a braking system according to some embodiments.

FIG. 1 illustrates a perspective view of a braking system 100 according to some embodiments. As shown in FIG. 1, the braking system 100 comprises a collector apparatus 102 coupled with a braking mechanism 104. The collector apparatus 102 is able to be detachably coupled to the braking mechanism 104 such that a user is able to selectively remove part or all of the collector apparatus 102 from the braking mechanism 104 in order to access the braking mechanism 104 and/or empty or replace the collector apparatus 102. Further, the collector apparatus 102 is able to be movably coupled to the braking mechanism 104 such that one or more components of the braking mechanism 104 are able to move independent of the collector apparatus 102. For example, the rotor 124 and hub 122 (see FIG. 3) of the braking mechanism 104 are able to rotate with respect to the collector apparatus 102, or in other words, the collector apparatus 102 is able to maintain its orientation with respect to the caliper and brake pads regardless of the movement of one or more components of the braking mechanism 104. In some embodiments, the brake mechanism 104 is a rotary brake mechanism for use with a motor vehicle such as a car. Alternatively, the brake mechanism 104 is able to be a non-rotary brake mechanism and/or for use with vehicular or non-vehicular products as are well known in the art.

Figure 2:
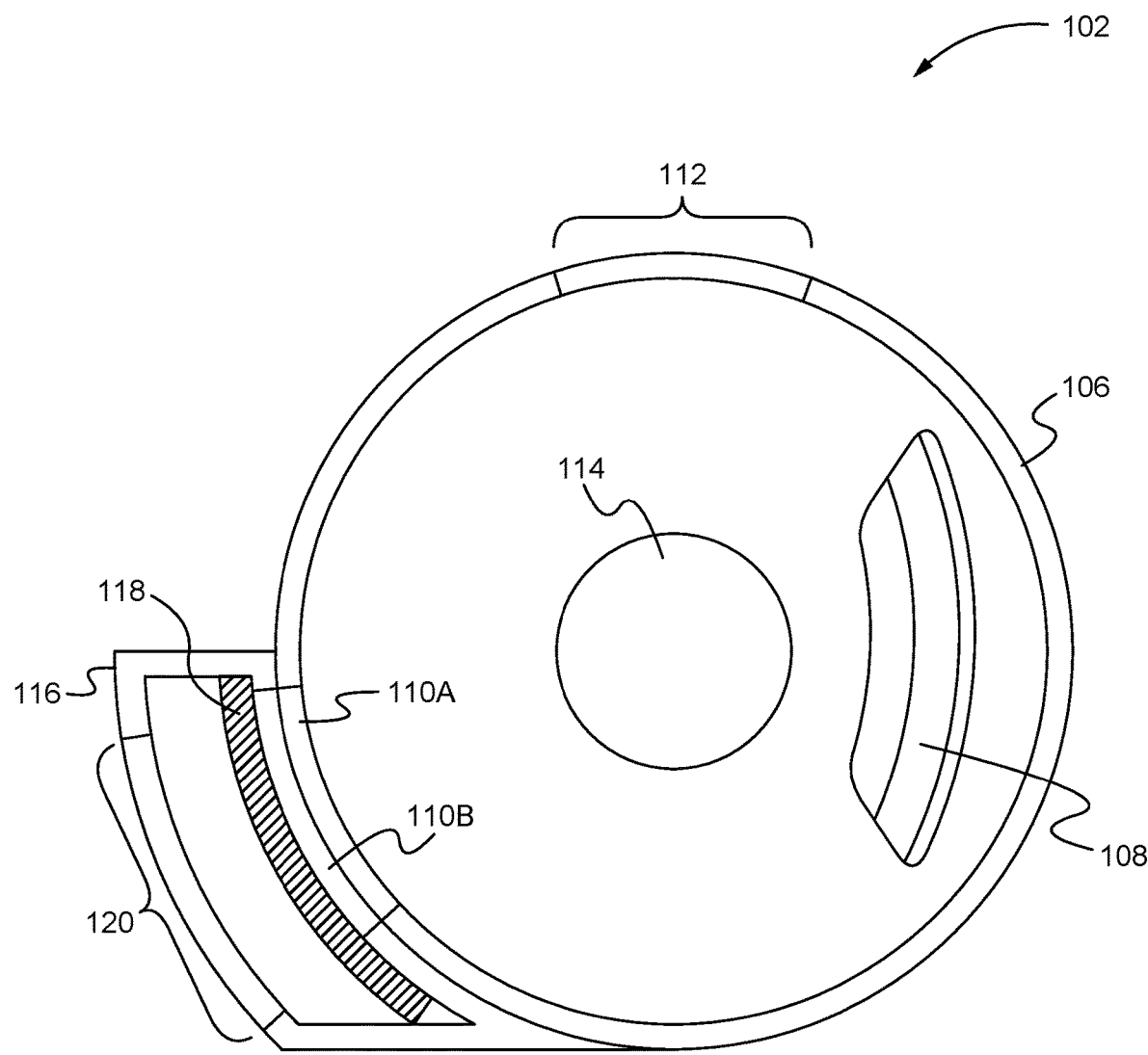
FIG. 2 illustrates a cross-sectional view of a collector apparatus of the braking system according to some embodiments.

FIG. 2 illustrates a cross-sectional view of the collector apparatus 102 according to some embodiments. As shown in FIG. 2, the collector apparatus 102 is able to comprise a shroud/housing 106 having one or more shroud inlets 108, one or more interface apertures 110A, one or more caliper apertures 112 and one or more hub apertures 114. In some embodiments, the shroud 106 is formed by two halves that detachably couple to each other around the brake mechanism 104. Alternatively, the shroud 106 is able to be formed as a single integrated piece.

The caliper apertures 112 are configured to receive the one or more calipers 126 such that the calipers 126 are accessible from outside the shroud 106. In particular, the caliper apertures 112 are able to be configured to contact and/or snugly fit around the calipers 126 such that air does not enter or exit through the caliper apertures 112. For example, in some embodiments the caliper apertures 112 form a hermetic seal with the calipers 126.

Similarly, the hub apertures 114 are configured to receive the hubs 122 such that the hubs 122 are accessible from outside the shroud 106. The hub apertures 114 are also able to be configured to contact and/or snugly fit around the hubs 122, and further are able to be configured to enable the hubs 122 to rotate within the hub apertures 114. The shroud inlets or gills 108 are able to be louvered or otherwise shaped protrusions that provide a channel for air and/or other material to enter the shroud 106 via the hole in the shroud 106 created by the protrusion. In some embodiments, the shroud inlets 108 are positioned on both sides of the shroud 106 and oriented such that their openings face substantially the same direction. For example, as shown in FIG. 1, the shroud inlets 108 are mirrored on opposite sides of the shroud 106 and have their openings partially or fully facing toward the direction of travel (e.g. to the right) of the device utilizing the braking mechanism 104 or toward the direction opposite the interface aperture 110A. Alternatively, some or all of the shroud inlets 108 are able to be positioned anywhere on the shroud 106 and oriented in any and/or different directions. In some embodiments, the interface apertures 110A are able to be positioned on the end of the shroud 106 that is opposite the direction in which the shroud inlets 108 are facing and/or positioned. For example, the interface aperture 110A shown in FIG. 2 is positioned on the end farthest away from the direction the inlets 108 are facing such that air entering the inlets 108 will move through/past the brake mechanism 104 and then exit the shroud 106 via the interface aperture 110A. As a result, this positioning is able to effectuate the movement of brake dust from the brake mechanism 104 through the interface aperture via the air entering the inlets 108. In particular, the positioning and dimensions of the shroud inlets 108 along with the positioning of the interface apertures 110A are able to be configured to control the speed and airflow such that it takes a desired path at a desired speed to maximize the likelihood of particle deposition into the catch elements 116. For example, a suction through the interface apertures 110A, 110B is able to be created by controlling the air path and air speed proximate the apertures 110A, 110B.

The collector apparatus 102 is also able to comprise one or more catch elements 116 coupled to the shroud 106. In some embodiments, the catch elements 116 are detachably coupled to the shroud 106. Alternatively, one or more of the catch elements 116 are able to be permanently coupled to and/or integrated into the shroud 106. The catch elements 116 are each able to be hollow and comprise one or more filters 118, one or more interface apertures 110B and one or more catch outlets 120. Alternatively, the one of more filters 118 are able to be omitted such that the catch element 116 alone serves to capture the brake dust. As shown in FIG. 2, the catch elements 116 are able to be positioned on the shroud 106 such that the catch interface aperture 110B is in communication with and/or at least partially aligns with one of the shroud interface apertures 110A. In some embodiments, the interface apertures 110A, 110B form an air tight seal with each other such that air cannot leak in or out through the interface between the interface apertures 110A, 110B. As a result, air carrying brake dust is able to move from the shroud 106 into the catch elements 116 via the interface apertures 110A, 110B. In some embodiments, one or more of the catch elements 116 are able to comprise fill sensors (not shown) that detect when the catch element 116 is full and needs to be emptied. The fill sensors are able to indicate to a user the fill level of the element 116 such that the user is able to empty the catch element 116 before it overflows and disrupts operation of the system 100.

The filters 118 of each catch 116 are able to be positioned such that they cover the interface apertures 110B of the catch 116. As a result, the filters 118 are able to filter the brake dust from the air entering the catch 116 from the shroud 106. In some embodiments, one or more of the filters 118 are able to be removable/replaceable such that as they become dirty they are able to be removed and replaced within the catch 116 by a new filter 118. In such embodiments, the catch element 116 is able to comprise one or more fasteners that selectively couple the filters 118 in position within the catch 116. Alternatively, one or more of the filters 118 are able to be permanently coupled to the catch elements 116. Additionally, as described above, in some embodiments the filters 118 are able to be omitted from one or more of the catch elements 116 such that the cavity within the catch elements 116 serves to collect and/or filter the brake dust from the air received from the shroud 106. In some embodiments, the catch elements 116 are able to comprise a detachable portion that collects the brake dust and is then able to be detached and emptied before being reattached to the catch 116.

In some embodiments, as shown in FIG. 1, the one or more catch outlets 120 of the catch elements 116 are able to be positioned adjacent to the edge of the shroud 106 and facing fully or partially forward with respect to the direction of travel (e.g. the same direction as the inlets 108). This positioning causes the air to reverse direction within the catch element 116 in order to enter through the interface aperture 110B and exit through the outlet 120 shown in FIG. 1. As a result, brake dust is able to be caught in the catch 116 as the air reverses direction. Alternatively, as shown in FIG. 2, the one or more catch outlets 120 of the catch elements 116 are able to be positioned to face fully or partially opposite the direction of travel (e.g. opposite the interface aperture 110B or the inlets 108). As a result, air received from the shroud 106 is able to freely exit the catch elements 116 without changing direction via the outlets 120, while the brake dust is captured by the filters 118. In either case, the catch elements 116 are able to provide the advantage of collecting the brake dust such that it is not distributed to the environment.

Figure 8:
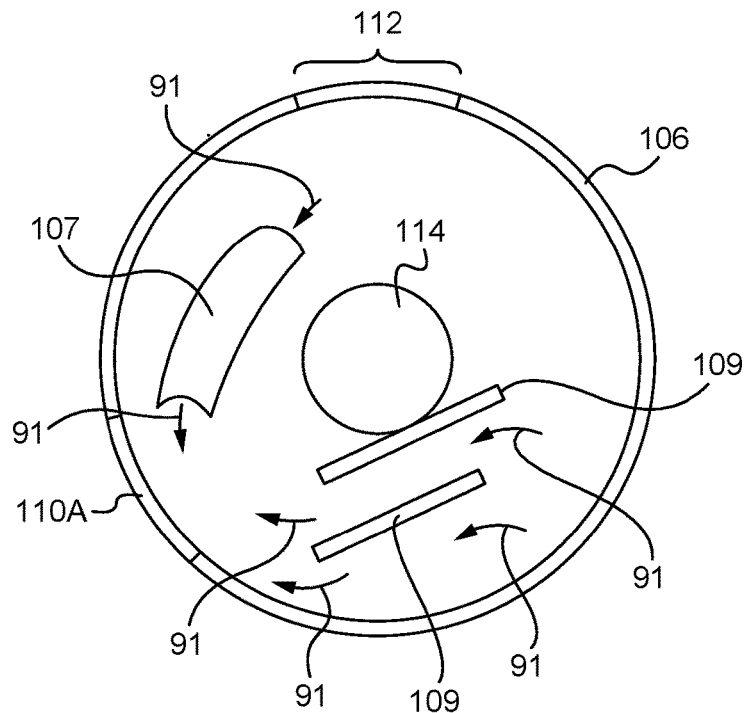
FIG. 8 illustrates a side cross-sectional view of a shroud of the collector apparatus according to some embodiments.

Although as shown in FIG. 2, the shroud 106 surrounds most or all of the braking mechanism 104, in some embodiments the shroud 106 is able to be smaller such that it only surrounds most or all of the callipers 126 and/or brake pads 128 or such that it only surrounds other portions of the braking mechanism 104. Further, as shown in FIG. 8, in some embodiments the shroud 106 is able to comprise one or more tunnels 107 and/or one or more vanes, guides or fins 109 that direct air 91 into the catch elements 116 (via interface 110A) and/or away from the apertures 112, 114 of the shroud 106 where the brake dust might escape into the external environment. In such embodiments, the shroud 106 is able to house some or all of the braking mechanism 104 as well as internally incorporate the tunnels 107 and/or guides 109 coupled to the inside of the shroud 106, or the shroud 106 is able to comprise the tunnels 107 and/or guides 109 in lieu of housing a portion of the braking mechanism 104. For example, in some embodiments the shroud 106 is able to not house any portion of the braking mechanism 104 and instead rely solely on the tunnels 107 and/or guides 109 to direct the air 91 and brake dust into the catch elements 116.

In some embodiments, the collector apparatus 102 comprises a venturi element or tunnel for creating a low pressure, vacuum or suction force positioned to bias the air and brake dust into the catch 116. For example, the catch 116 is able to comprise a venturi pathway or tunnel that narrows between an air inlet and an air outlet thereby creating a low pressure area in the narrowed area. In particular, this low pressure area is able to be in communication with, adjacent to and/or aligned with the interface aperture 110B and/or filter 118 such that the low pressure creates a suction force on the interface aperture 110B and/or filter 118 and thereby suck the dirty air into the catch 116 from within the shroud 106. In some embodiments, the air inlet of the venturi element is able to face fully or partially forward with respect to the direction of travel (e.g. the same direction as the inlets 108) in order to receive outside air as it passes the collector 102. In some embodiments, the body or structure of the catch 116 forms the venturi element. Alternatively, the venturi element is able to be coupled to the catch 116 to create the venturi pathway.

Figures 9A, 9B:
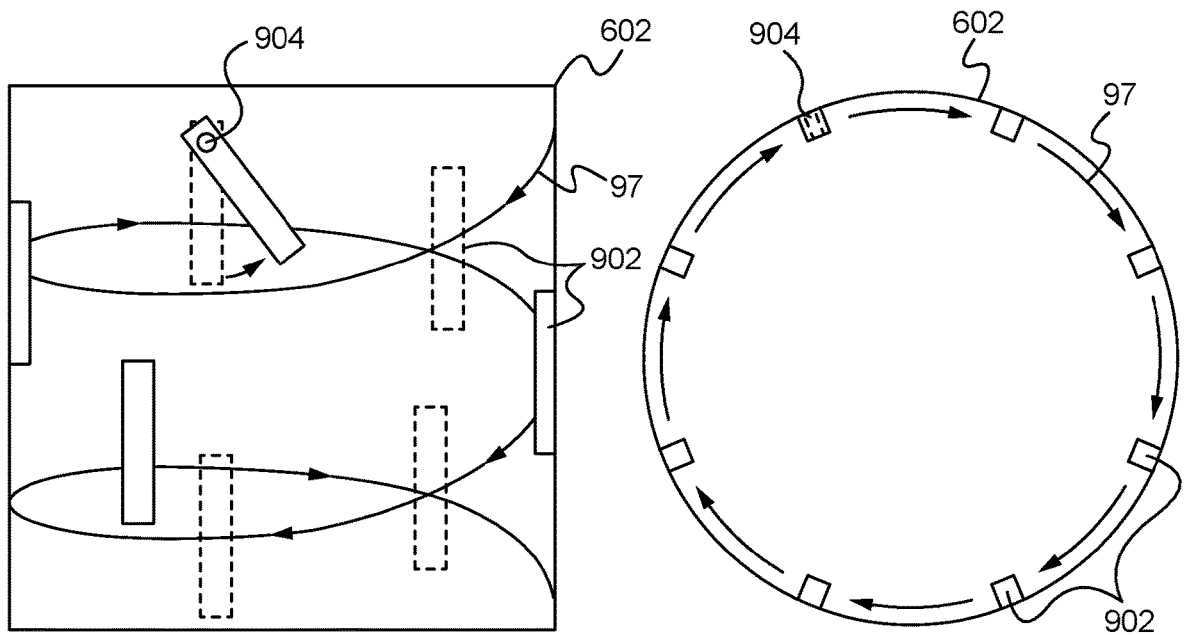
FIG. 9A illustrates a side cross-sectional view of a cyclone chamber of the collector apparatus having a venturi feature according to some embodiments.
FIG. 9B illustrates a top cross-sectional view of a cyclone chamber of the collector apparatus having a venturi feature according to some embodiments.

In some embodiments, the venturi element is able to comprise a cyclone chamber 602 and/or collector apparatus 600 as shown in FIGS. 9A and 9B. In such embodiments, the cyclone chamber 602 and/or collector apparatus 600 is able to supplement or replace the catch 116. For example, the brake dust inlet 606 is able to be positioned in communication with, adjacent to and/or aligned with the interface aperture 110B and/or filter 118 such that the low pressure creates a suction force on the interface aperture 110B and/or filter 118 and thereby suck the dirty air into the catch 116 from within the shroud 106. Additionally, the main inlet 604 is able to face fully or partially forward with respect to the direction of travel (e.g. the same direction as the inlets 108) in order to receive outside air as it passes. As a result, the addition of a venturi element (tunnel or cyclone) is able to provide the benefit of providing a suction force on the interface aperture 110B and/or filter 118 which increases the amount of brake dust that is collected by the collector apparatus 100, 600.

Figure 3:
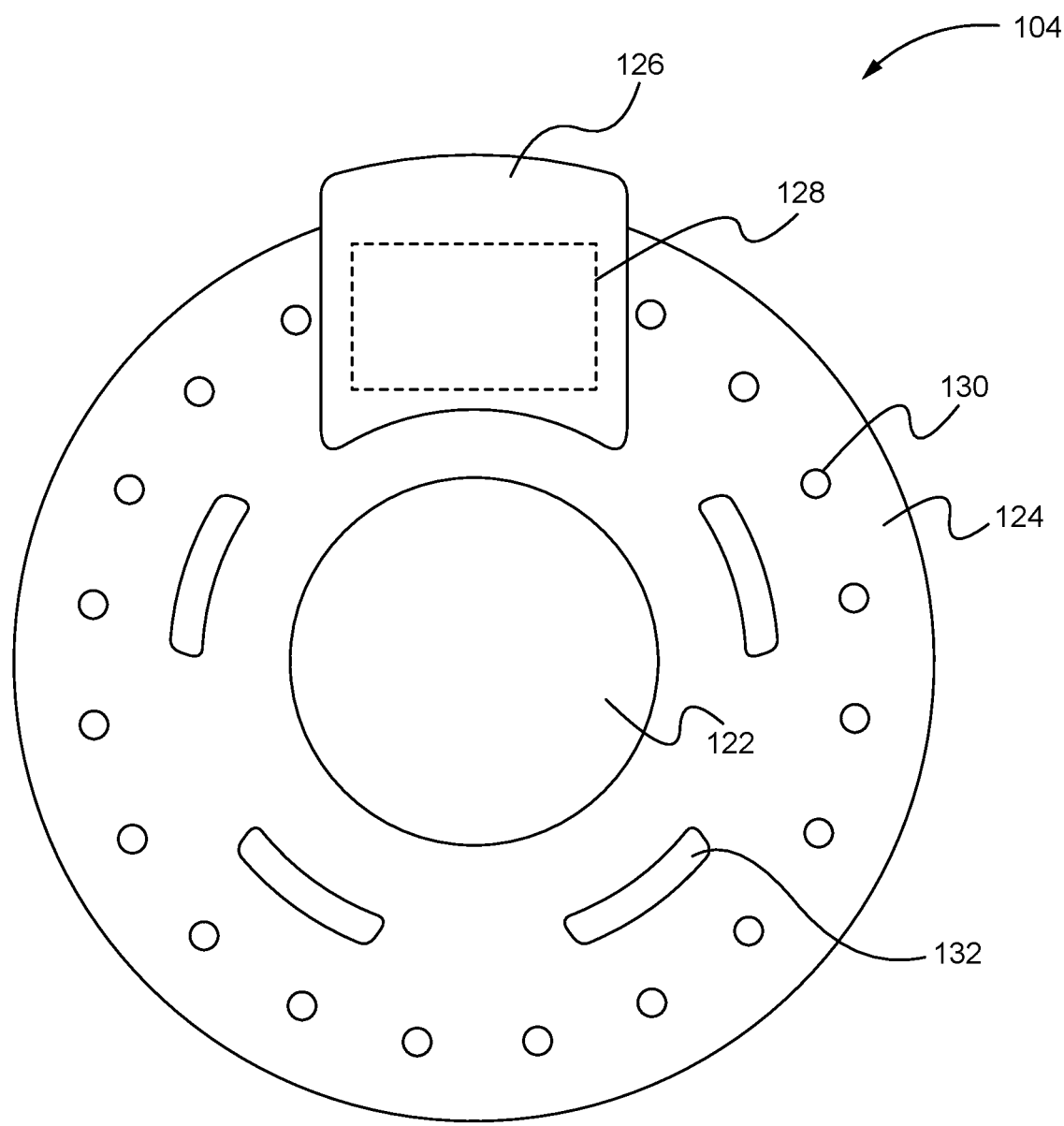
FIG. 3 illustrates a profile view of a braking mechanism of the braking system according to some embodiments.

FIG. 3 illustrates a profile view of the braking mechanism 104 according to some embodiments. As shown in FIG. 3, the brake mechanism 104 is able to comprise a hub 122, a rotor or disc 124, one or more calipers 126 and one or more brake pads 128. In some embodiments, the brake mechanism 104 comprises two brake pads 128 for each caliper 126. Alternatively, more or less brake pads 128 are able to be used for each caliper 126. Additionally, it should be noted that the brake mechanism 104 is able to include one or more additional components well known in the art, which have been omitted for the sake of brevity. The rotor 124 is coupled to the hub 122 and straddled by the brake pads 128 which are operably coupled with the calipers 126. In some embodiments, the rotor 124 comprises one or more holes 130 and/or one or more surface channels 132. Specifically, the holes 130 and surface channels 132 are able to provide increased heat dissipation as well as the removal of gas, water and other material on the rotor 124. Although as shown in FIG. 3 the holes 130 and channels 132 are evenly spaced and positioned at different radiuses of the rotor 124, the holes 130 and/or channels 132 are able to be positioned anywhere on the rotor 124 uniformly or non-uniformly spaced. Alternatively, the holes and/or channels 132 are able to be omitted. In operation, the calipers 126 cause the brake pads 128 to apply force to the rotor 124 thereby slowing the rotation of the rotor 124 and the hub 122. In the process, one or more particles of the brake pads 128 or other components of the braking mechanism 104 become loose and separate from the mechanism 104. These separated particles along with dirt and other loose particles that are around the braking mechanism 104 collectively comprise brake dust which is a pollutant to the environment as well as possibly harmful to surrounding devices.

In operation, as the system 100 moves (e.g. in the direction of the inlets 108), air flowing across the system 100 is guided into the shroud 106 by the inlets 108. This air travels through the shroud 106 around the braking mechanism 104 picking up brake dust and carrying the brake dust into the catch elements 116 via the interface apertures 110A, 110B as "dirty air". In some embodiments, as the "dirty air" enters the catch elements 116 it travels through the one or more filters 118 which collect the brake dust from the "dirty air" such that only "clean air" without brake dust exits the filters 118 and the catch elements 116 via the one or more catch outlets 120. Alternatively, the filters 118 are able to be omitted and/or the "dirty air" is forced to change direction by positioning the catch outlet 120 such that the outlet 120 faces the inlets 108. As a result of the centrifugal force caused by the direction change of the "dirty air", the brake dust separates from the air and is collected in the cavity of the catch elements 116 such that only "clean air" exits the outlet 120. Additionally, one or more particles of brake dust will impact with the shroud 106 and then fall into the catch elements 116 via gravity thereby increasing the percentage of brake dust captured by the system 100. The filters 118 and/or catch elements 116 are then able to be emptied and/or replaced to safely remove the collected brake dust. As a result, the system 100 provides the advantages of maintaining a cleaner brake mechanism 104 as well as a cleaner environment around the brake mechanism 104. Further, the system 100 provides the advantage of increasing of the cooling the braking mechanism during operation by directing (e.g. greater and/or faster) air flow through the brake mechanism 104.

Figure 4:
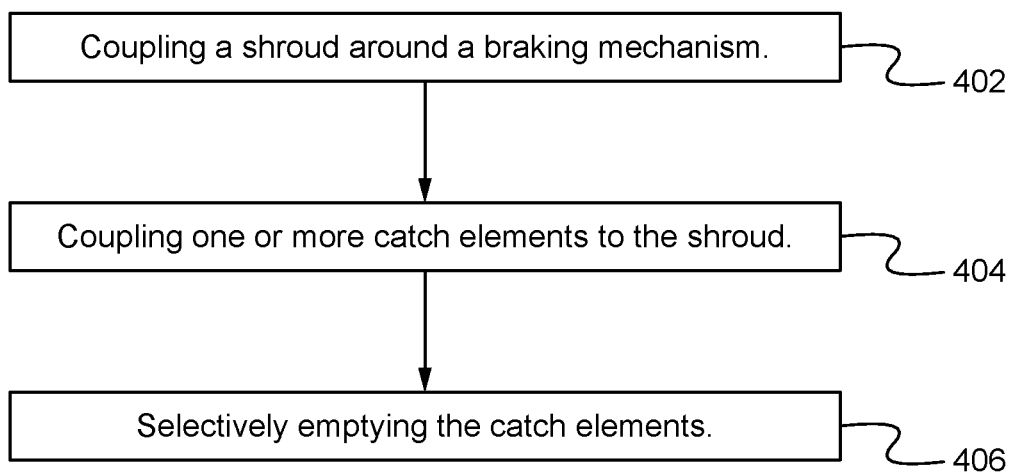
FIG. 4 illustrates a flow chart of a method of using the braking system according to some embodiments.

FIG. 4 illustrates a flow chart of a method of utilizing the braking system 100 according to some embodiments. As shown in FIG. 4, a user couples a shroud 106 around a braking mechanism 104 at the step 402. The user couples one or more catch elements 116 to the shroud 106 at the step 404. The catch elements 116 are able to be positioned such that the interface apertures 110A, 110B are at least partially aligned forming an air channel between the shroud 106 and the catch elements 116. In some embodiments, the catch elements 116 are able to be permanently coupled to the shroud 106 such that steps 402 and 404 are combined and when the shroud 106 is coupled to the braking mechanism 104 the catch elements 116 are as well. The user selectively empties the catch elements 116 at the step 406. In some embodiments, emptying the catch elements 116 comprises separating the catch elements 116 from the shroud 106 and dumping out the brake dust and/or removing one or more filters 118 within the catch elements 116. Alternatively, emptying the catch elements 116 is able to comprise opening and/or detaching a component of the catch elements 116 and dumping out the brake dust and/or removing one or more filters 118 within the component. In some embodiments, the method further comprising replacing the one or more filters 118 within the catch elements 116 and/or reattaching the emptied catch elements 116 to the shroud 106. Accordingly, as described above, the method provides the advantages of maintaining a cleaner brake mechanism 104 as well as a cleaner environment around the brake mechanism 104. Further, the method provides the advantage of increasing the cooling of the braking mechanism during operation by directing air flow through the brake mechanism 104.

Figure 5:
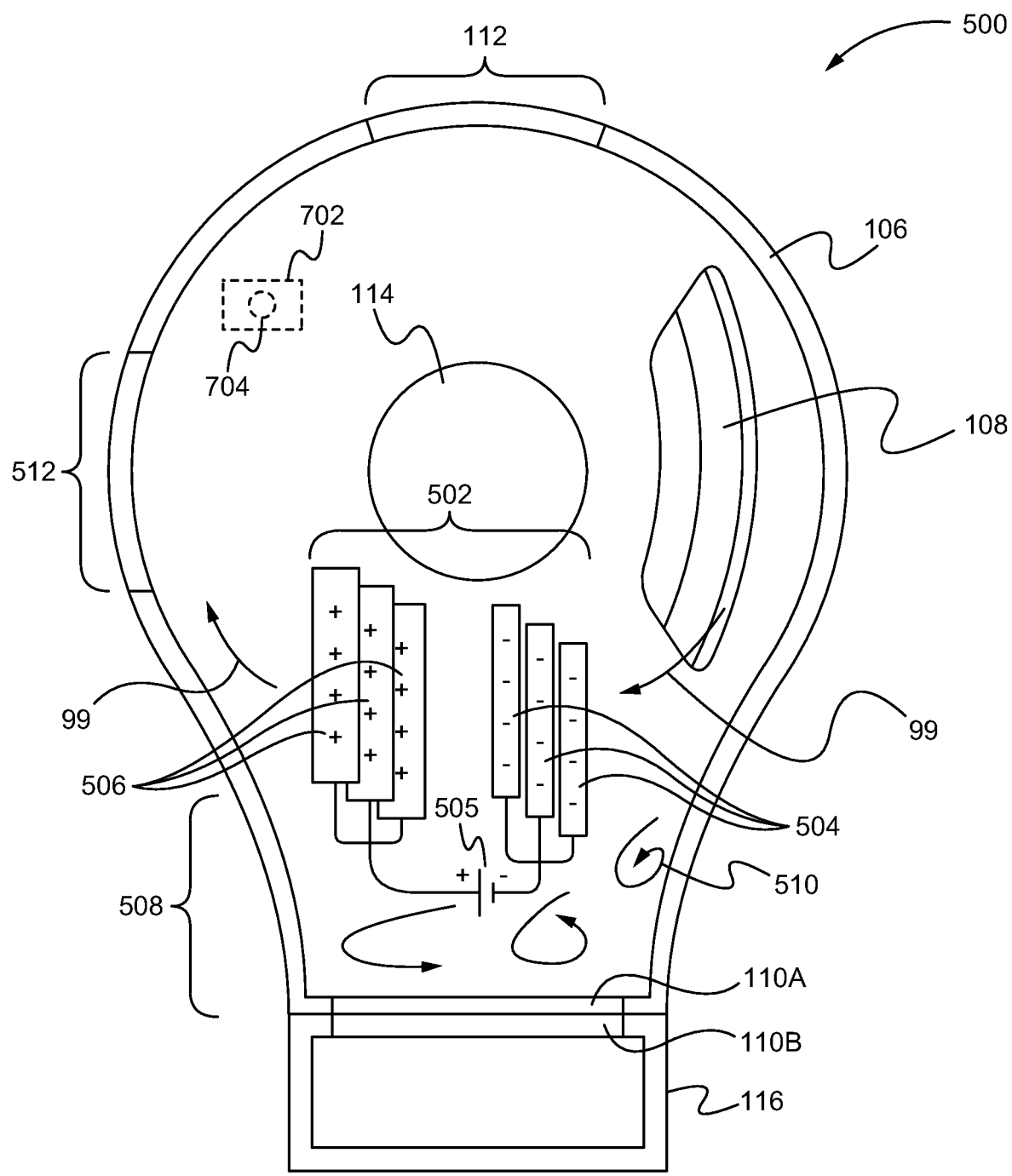
FIG. 5 illustrates a cross-sectional view of a collector apparatus having an electrostatic feature according to some embodiments.

FIG. 5 illustrates a cross-sectional view of a collector apparatus 500 having an electrostatic feature according to some embodiments. The collector apparatus 500 shown in FIG. 5 is substantially similar to the collector apparatus 102 except for the differences described herein. As shown in FIG. 5, the collector apparatus 500 comprises an electrostatic precipitator 502 and a shroud 106 having an extended cavity 508 and a shroud outlet 512. Alternatively, one or more of the electrostatic precipitator 502, the extended cavity 508 or the shroud outlet 512 are able to be omitted. The electrostatic precipitator 502 is positioned within the shroud 106 adjacent to the braking mechanism 104 (not shown) and/or in the path 99 of the air entering and exiting the shroud 106. Accordingly, although the precipitator 502 of FIG. 5 is shown below the hub aperture 114 of the shroud 106, all other positions within the shroud 106 and/or catch element 116 are contemplated. Similarly, although the extended cavity 508 is shown at the bottom of the shroud 106 and the shroud outlet 512 is shown across from the inlet 108, the cavity 508 and/or outlet 512 are able to be positioned elsewhere on the shroud 106. Finally, the precipitator 502 is able to be positioned anywhere within the airstream such that the precipitator 502 is able charge and capture the brake dust and/or other particles. The shroud outlet 512 provides an opening where the air entering the shroud 106 via the inlets 108 are able to exit the shroud 106. In particular, the position of the shroud outlet 512 and/or the shroud inlets 108 are able to be adjusted in order to control the path 99 of the air (e.g. through the precipitator 502) as it travels through the shroud 106. In some embodiments, the apparatus 500 comprises a magnetic brake mechanism 702 having one or more magnets 704 (described in detail below) within the shroud 106. Alternatively, the magnetic brake mechanism 702 is able to be positioned outside the shroud 106 or omitted.

The electrostatic precipitator 502 comprises one or more power sources 505, one or more electrodes or wires 504 and one or more plates 506. The wires 504 and plates 506 are positioned such that air entering the shroud passes through or by the wires 504 and then in between (e.g. a vertical stack of) or by the plates 506. The power sources 505 are electrically coupled with the wires 504 and the plates 506 and create a voltage difference between the wires 504 and the plates 506. For example, the power supply 505 is able to apply a negative voltage of several thousand volts between wires 504 and plates 506 such that an electric (corona) discharge ionizes particles (e.g. brake dust) in the air that flow through/by the wires 504. As a result, the charged/ionized particles follow the negative electrical field created by the power supply 505 and are attracted to the positively charged plates 506. Accordingly, the particles collect on the plates 506 instead of following the path 99 of the air out into the environment. In some embodiments, the wires 504 are able to be replaced or supplemented by charging one or more components of the braking mechanism 104 itself. As a result, the braking mechanism components ionize the brake dust and the particles again follow the negative electrical field created by the power supply 505 and are attracted to the positively charged plates 506. It should be noted that although as discussed above the plates 506 are positively charged and the wires 504 or braking mechanism components are negatively charged, the plates 506 are able to be negatively charged and the wires 504 or braking mechanism components are able to be positively charged.

The extended cavity 508 is positioned within the shroud 106 adjacent to the path 99 of the air through the shroud 106 in order to create one or more eddy currents 510 within the extended cavity 508. In particular, the extended cavity 508 is able to protrude from the contours of the braking mechanism 102 (e.g. the rotor 124) in order to create an area where eddy currents 510 are able to form. As shown in FIG. 5, the extended cavity 508 is adjacent to the interface apertures 110A, 110B and the catch element 116. As a result, the eddy currents 510 caused by the extended cavity 508 are able to both guide brake dust within the air into the catch element 116 and/or redirect air and brake dust through the precipitator 502 such that any missed brake dust particles are collected by the precipitator 502. Additionally, any particles not gathered by the precipitator 502 are able to be caught by the eddy currents 510 and thereby drop into the catch element 116.

In some embodiments, the a plate cleaning mechanism (not shown) is able to periodically clean the particles off the plates 506 such that the plates 506 do not become saturated. Alternatively, the plates 506 are able to be substantially self-cleaning due to the force of gravity and/or the motion of the system 100 during operation. In some embodiments, the precipitator 502 comprises a saturation sensor (not shown) that detects if the plates 506 are saturated by brake dust or other particles and provides a signal indicating the plates 506 saturation status to a user such that the user knows when/if the plates 506 need to be cleaned/replaced. In some embodiments, the precipitator 502 is able to comprise other types of sensor, such as maintenance sensors, that indicate when the precipitator 502 requires repair or is no longer operating correctly. In some embodiments, one or more components (e.g. catch elements 116) of the system 100 are able to comprise a sticky or adhesive surface for facilitating the capturing of the brake dust. In some embodiments, the collector apparatus 500 is able to comprise a thermal component (not shown) that utilizes a heat source to heat up dust particles in order to facilitate their collection.

In operation, the collector apparatus 500 guides air into the shroud 106 via the inlets 108 where the air picks up brake dust and travels along path 99 through the electrostatic precipitator 502 before exiting via the shroud outlet 512. When traveling through the precipitator 502, the brake dust is ionized by the wires 504 such that the brake dust adheres to the plates 506. In addition, the extended cavity 508 creates eddy currents 510 within the air that guides brake dust into the catch element 116 and/or redirects the air and brake dust through the precipitator 502. As a result, the brake dust is collected on the plates 506 and within the catch element 116 instead of being released into the environment. Further, vibrations and other movements of the collector apparatus 500 (along with gravity and the eddy currents 510) cause the brake dust collected by the plates 506 to drop into the catch element 116. The catch element 116 is then able to be emptied and/or replaced to safely remove the collected brake dust. As a result, the collector apparatus 500 provides the advantages of maintaining a cleaner brake mechanism 104 as well as a cleaner environment around the brake mechanism 104. Further, the collector apparatus 500 provides the advantage of increasing of the cooling the braking mechanism during operation by directing air flow through the brake mechanism 104.

Figure 6A:
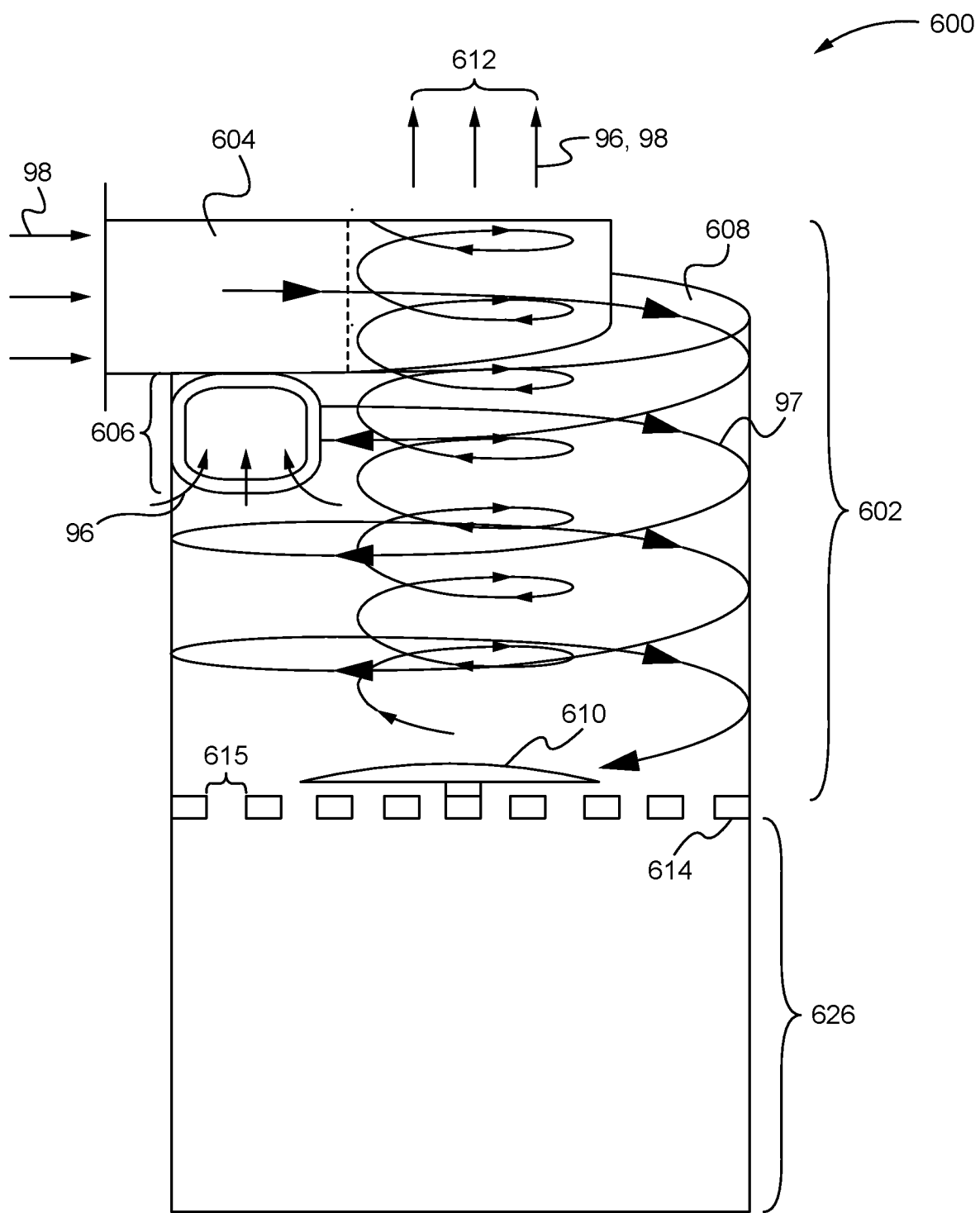
FIG. 6A illustrates a profile view of the collector apparatus having the venturi feature according to some embodiments.
Figure 6B:
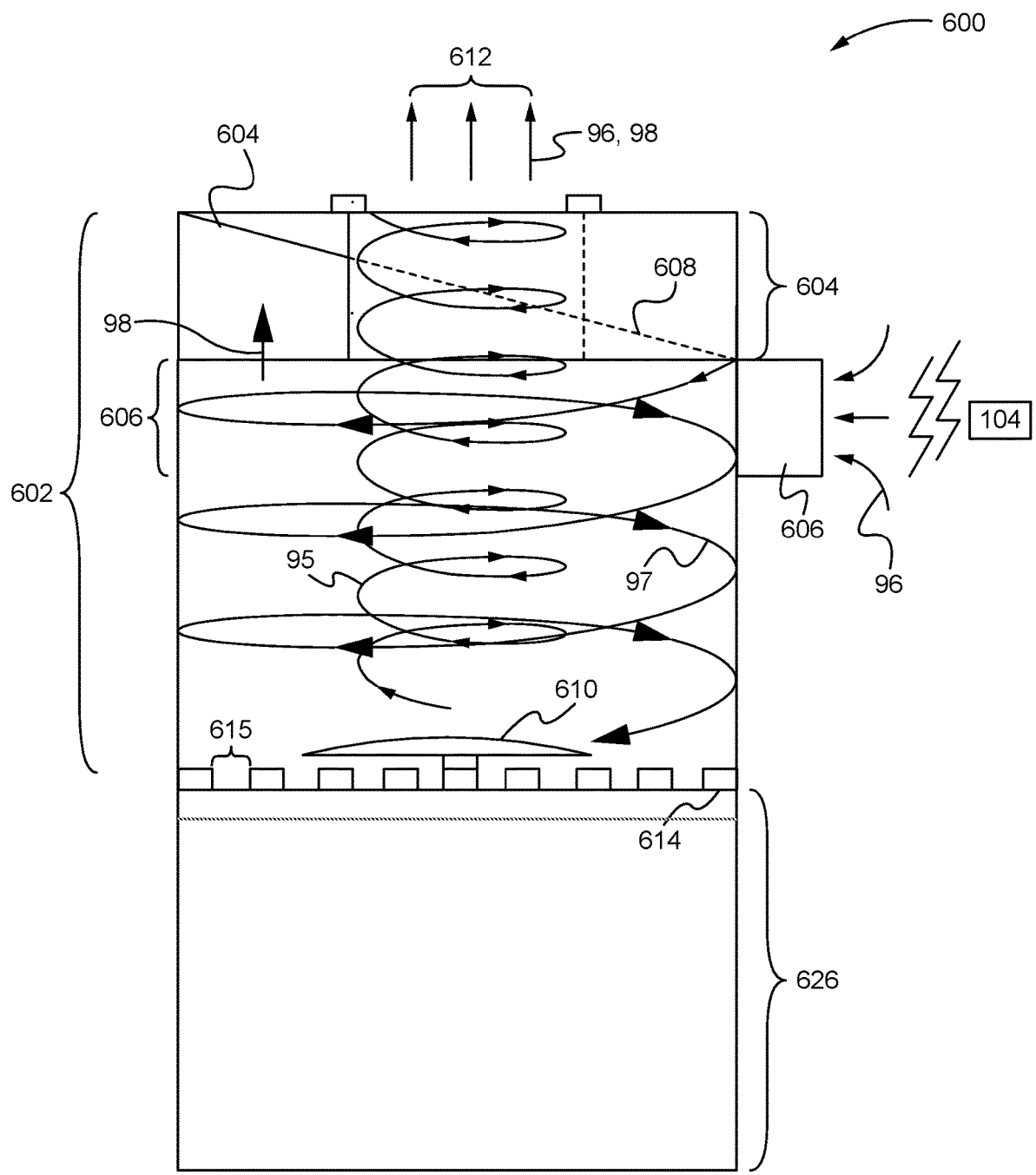
FIG. 6B illustrates the profile view of the collector apparatus having the venturi feature of FIG. 6A rotated by 90 degrees according to some embodiments.

FIG. 6A illustrates a profile view of the collector apparatus 600 according to some embodiments and FIG. 6B illustrates the profile view of the collector apparatus 600 of FIG. 6B rotated by 90 degrees according to some embodiments. As shown in FIGS. 6A and 6B, the collector apparatus 600 comprises a collection canister 626 coupled with a cyclone chamber 602 having a main inlet 604, a brake dust inlet 606, a spiral ramp 608, a vortex reversal plate 610, a vortex outlet 612 and a hopper 614. Additionally, the collector apparatus 600 is able to comprise one or more coupling elements (not shown) for permanently or detachably coupling the apparatus 600 to the brake mechanism 104. For example, the apparatus 600 is able to be coupled to the braking mechanism 104 such that the venturi inlet 604 faces and is positioned proximate to the braking mechanism 104, and the main inlet 604 is facing the direction of motion of the device utilizing the braking mechanism 104. The cyclone chamber 602 is substantially a circular cylinder. Alternatively, the cyclone chamber 602 is able to be other shapes such as an elliptic cylinder, hyperbolic cylinder, parabolic cylinder or other types of prisms, cylindrical or non-cylindrical as are well known in the art.

The main inlet 604 is able to be positioned at the top of the cyclone chamber 602 and forms a funnel or venturi that guides air into the cyclone chamber 602 along the spiral ramp 608 that is also positioned on the top of the cyclone chamber 602. Because of this communication between the main inlet 604 and the spiral ramp 608, air 98 that enters the main inlet 604 is propelled in a downward spiral or vortex path 97 along the perimeter of the chamber 602 past the brake dust inlet 606 toward the bottom of the chamber 602. Additionally, because of the venturi created by the funneling or narrowing of the inlet 604, the air 98 increases in speed and lowers in pressure as the air 98 passes the brake dust inlet 606 along the vortex path 97. This creates a suction on the brake dust inlet 606 thereby causing the brake dust inlet 606 to suck in brake dust filled air 96 from the brake mechanism 104. This "dirty air" 96 joins the air 98 and spirals downward along the path 97 until it reaches the vortex reversal plate 610 where the air 96, 98 "bounces" off of the top of the reversal plate 610 and moves in an upward spiral or vortex path 95 until it exits the chamber 602 via the vortex outlet 612.

The vortex reversal plate 610 is positioned at the bottom of the cyclone chamber 602 just above the hopper 614 and/or bottom of the chamber 602. By the time the air 96, 98 has reached the reversal plate 610, the centrifugal force of the vortex path 97 of the air 96, 98 has caused the brake dust to accumulate and move downwardly on the inner walls of the chamber 602. As a result, as the air 96, 98 switches to the vortex path 95 the brake dust is distributed/collected on the bottom of the chamber 602 under the reversal plate 610 and on top of the hopper 614. The hopper 614, which comprises one or more holes 615, provides a pathway for the brake dust to fall from the cyclone chamber 602 into the collection canister 626 where it is stored and periodically emptied. In particular, the collection canister 626 is able to be detachably coupled to the cyclone chamber 602 such that the brake dust is able to be removed from the canister 626 and then the emptied canister 626 able to be re-coupled to the cyclone chamber 602. For example, in some embodiments the canister 626 and cyclone chamber 602 are threaded such that the canister 626 is able to be screwed into and out of the cyclone chamber 602. Thus, the collection apparatus 600 provides the advantage of collecting brake dust in the collection canister 626 such that it is not released into the environment.

In some embodiments, the holes 615 of the hopper 614 are only positioned under the reversal plate 610 in order to protect the holes 615 from the forces of the spiraling air 98, 96 within the chamber 602. Alternatively, one or more of the holes 615 are able to be positioned in the hopper 614 beyond the perimeter of the reversal plate 610. In some embodiments, the hopper 614 has a flat surface. In some embodiments, the hopper 614 is able to be angled toward the center of the chamber 602 to guide the brake dust particles to the center of the chamber 602 under the reversal plate 610 before falling into the collection canister. In some embodiments, the reversal plate 610 has an upwardly convex, parabolic or curved upper surface and a flat, concave or hollow underside. Alternatively, the reversal plate 610 is able to have a cone-like or pyramid-like upper surface or other non-flat upper surface configured to cause the air along the vortex path 97 to switch to the upward vortex path 95. In some embodiments, the cyclone chamber 602 is able to have fins the downwardly spiral along the inner perimeter of the chamber 602 in order to further facilitate the vortex path 97 of the air 98. Alternatively, in some embodiments the spiral ramp 608 is able to continue partially or fully downward to the bottom of the chamber 602 thereby forming a channel that forces the air 98 to follow the vortex path 97. In some embodiments, the walls of the vortex outlet 612 are able to be extended fully or partially downward to the reversal plate 610 of the chamber 602 in order to further facilitate the upward vortex path 96 by shielding the upward vortex 96 from the downward vortex path 97. In some embodiments, one or more components (e.g. canister 626 or pillars 902) of the of the collector apparatus 600 are able to comprise a sticky or adhesive surface for facilitating the capturing of the brake dust.

FIGS. 9A and 9B illustrate side and top cross-sectional view of the cyclone chamber 602 according to some embodiments. As shown in FIGS. 9A and 9B, the inner walls of the cyclone chamber 602 are able to comprise one or more blocking pillars 902 that block, capture and/or direct brake dust particles from path 97 down to the hopper 614. In particular, the pillars 902 are positioned vertically and/or angled along the inner perimeter of the chamber 602. In some embodiments, one or more of the pillars 902 are able to have a hinge 904 such that they are able to move about the hinge 904 when contacted by the brake dust and/or air flow. Alternatively, one or more of the pillars 902 are fixed in place on the inner surface of the chamber 602 such that they do not move when contacted by the brake dust and/or air flow. In some embodiments, one or more of the pillars 902 are able to be porous and/or comprise a screen or filter such that the air flow is able to pass through the pillars 902, but the brake dust particles are blocked by the pillars 902. In some embodiments, the chamber 602 is able to comprise one or more exit apertures (not shown) that serve to collect the brake dust that is caught by the pillars 902 and/or to route the brake dust to the canister 626. In some embodiments, the pillars 902 extend from the top to the bottom of the chamber 602. Alternatively, one or more of the pillars 902 are able to extend less than the full height of the chamber 602 and/or in between the top and bottom of the chamber 602. In some embodiments, one or more components (e.g. canister 626 or pillars 902) of the of the collector apparatus 600 are able to comprise a sticky or adhesive surface for facilitating the capturing of the brake dust.

Figure 7A:
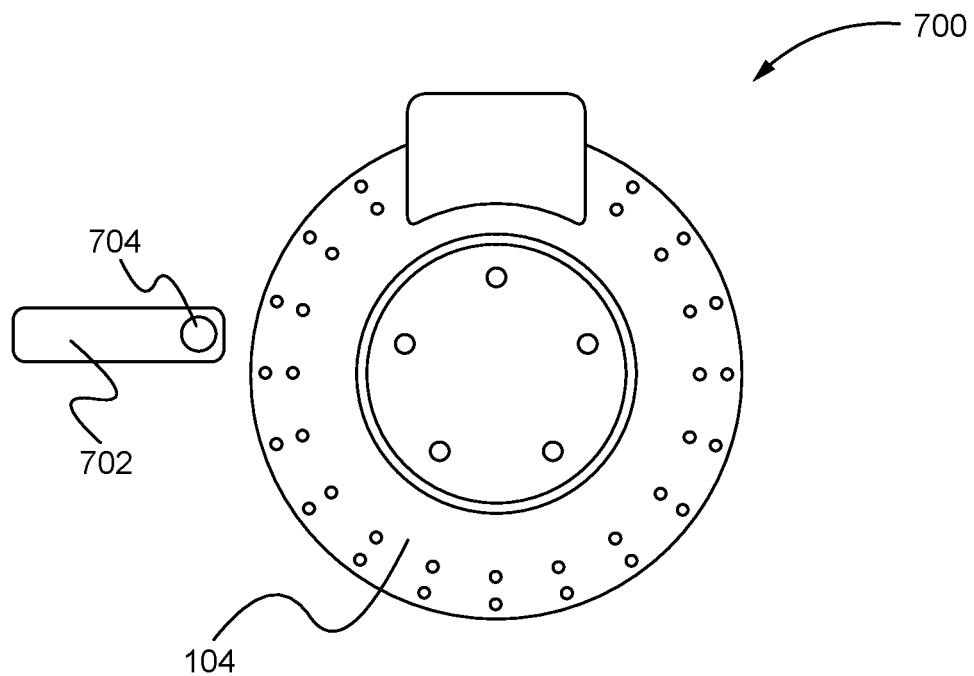
FIG. 7A illustrates a profile view of a braking system according to some embodiments.
Figure 7B:
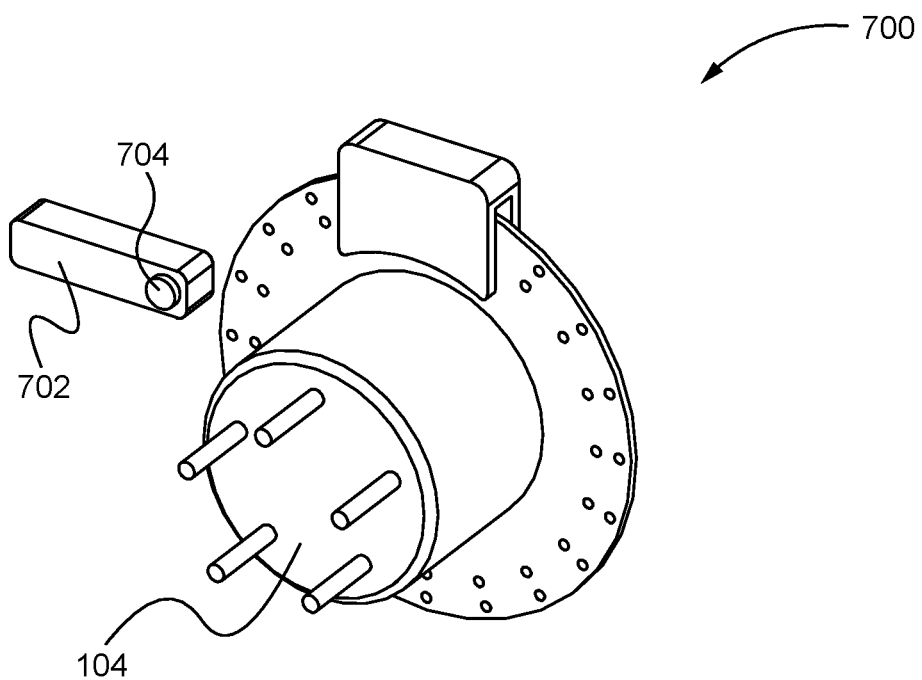
FIG. 7B illustrates a perspective view of the braking system according to some embodiments.

FIGS. 7A and 7B illustrate a profile view and a perspective view of a braking system 700 according to some embodiments. As shown in FIGS. 7A and 7B, the braking system comprises a braking mechanism 104 operably coupled with a magnetic brake mechanism 702 having one or more magnets 704. Although only a single magnetic brake mechanism 702 having a single magnet 704 is illustrated, it is contemplated that any number of brake mechanisms 702 having any number of magnets 704 are able to be coupled with the braking mechanism 104. In some embodiments, one or more of the magnets 704 are rare earth magnets such as neodymium. Alternatively, the magnets 704 are able to comprise other types of magnets. Alternatively, one or more of the magnets 704 are able to be replaced with other magnetic field inducing devices or objects including devices having variable magnetic fields such as Tesla coils.

The magnetic braking mechanism 702 is able to be configured to move the magnet 704 relative to the braking mechanism 104 between a first position and a second position. In some embodiments, the first position is a proximal position adjacent to the rotor of the braking mechanism 104 and the second position is a distal position farther away from the rotor of the braking mechanism 104. Alternatively, the first position is able to be a first orientation of the magnet 704 such that the magnetic field or eddy current of the magnet 704 resists the motion of the rotor of the braking mechanism 104 and the second position is able to be a second orientation of the magnet 704 such that the magnetic field or eddy current of the magnet 704 does not resist the motion of the rotor of the braking mechanism 104. Alternatively, the first and/or second positions are able to be combinations of proximal or distal positions and orientations of the magnet 704. Alternatively, instead of or in addition to moving the magnet 704, the magnet 704 is able to be replaced and/or supplemented with a device having a variable magnetic field or eddy current. In such embodiments the strength and/or direction of the magnetic field or eddy current of the device is able to be adjusted (e.g. electrically) from a first mode that resists the motion of the rotor to a second mode that does not significantly resist or aids the motion of the rotor. For example, the first mode is able to be implemented by increasing the power to the device such that the strength of the magnetic field or eddy current is increased and oriented such that it opposes the movement of the rotor. Contrarily, the second mode is able to be implemented by removing all power such that the magnetic field or eddy current is removed, lessening the power such that the field or current strength is weakened or reversing the direction of the field or current and/or adjusting its power such that it aids in the rotation of the rotor.

In operation, when braking is desired the magnetic brake mechanism 702 moves the magnet 704 into the first position such that the magnetic field of the magnet provides a magnetic force or eddy current that resists the rotation of the rotor of the braking mechanism 104 thereby slowing the rotor. In contrast, when braking is not desired the magnetic brake mechanism 702 moves the magnet 704 into the second position such that the magnetic force or eddy current of the magnet 704 no longer significantly affects the rotor and thus it is no longer slowed. As a result, the brake dust produced by the braking mechanism 104 is reduced because the slowing of the rotor by the magnetic braking mechanism 702 reduces the amount of braking required by the braking mechanism 104 which produces the brake dust. In some embodiments, the magnetic brake mechanism 702 is configured to cause the braking/slowing of the rotor (e.g. movement to the first position) before the braking mechanism 104 begins braking the rotor with the brake pads. Alternatively, the magnetic brake mechanism 702 is able to be configured to cause the braking/slowing of the rotor before, during and/or after the braking of the braking mechanism 104. The braking system 700 is able to be incorporated into any of the other braking systems 100 described herein. Alternatively, the braking system 700 is able to be a standalone braking system.

The braking systems, devices and methods described herein have numerous advantages. Specifically, they provide the advantage of maintaining a cleaner brake mechanism as well as a cleaner environment around the brake mechanism. Further, they provide the advantage of increasing the cooling of the braking mechanism during operation by directing air flow through the brake mechanism. Moreover, they provide the advantage of reducing the braking required by the braking mechanism thus reducing the amount of brake dust produces per braking instance. This results, in less pollution and better performance of devices that use brakes, such as vehicles, because the brake dust does not interfere with or otherwise harm the components of the vehicles and other brake system utilizing devices.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A braking apparatus for collecting brake dust caused by braking a vehicle having a front and a rear, the braking apparatus comprising:
  a braking mechanism of the vehicle having one or more brake pads;
  a shroud coupled with the braking mechanism and having a hollow body forming a cavity, the hollow body including a shroud inlet aperture and a shroud outlet aperture with an air path between the shroud inlet aperture and the shroud outlet aperture, wherein the shroud inlet aperture faces the front of the vehicle, and further wherein the shroud inlet aperture is fully bounded by a first portion of the hollow body and the shroud outlet aperture is fully bounded by a second portion of the hollow body separate from the first portion; and
  a catch canister coupled with the shroud, wherein the brake dust separates from the air path between the shroud inlet aperture and the shroud outlet aperture and is caught by the catch canister.

2. The apparatus of claim 1, wherein the braking mechanism comprises one or more calipers, a rotor and a hub, wherein the calipers are fixedly coupled with the shroud whereas the rotor and hub are both rotatably coupled with the shroud such that the rotor and the hub are able to rotate with respect with the shroud.

3. The apparatus of claim 2, wherein the cavity is structured to fit around the rotor of the braking mechanism and the shroud comprises one or more caliper apertures and one or more hub apertures sized to receive the calipers and the hub of the braking mechanism.

4. The apparatus of claim 1, wherein inner walls of the shroud forming the cavity comprise air fins that guide the air along a desired route.

5. The apparatus of claim 1, wherein the shroud inlet aperture is positioned nearby the catch canister.

6. The apparatus of claim 1, wherein a flow of the brake dust is directed to the catch canister.

7. The apparatus of claim 1, further comprising an electrostatic precipitator having one or more plates, one or more electrodes and a power source that maintains a voltage difference between the plates and the electrodes.

8. The apparatus of claim 7, wherein the electrostatic precipitator is positioned within the cavity of the shroud such that the electrodes are between the plates and the shroud inlet aperture.

9. The apparatus of claim 8, wherein the catch canister is positioned nearby the plates to catch brake dust that falls off the plates.

10. The apparatus of claim 2, further comprising a magnetic braking element having a magnetic field generator, wherein the magnetic braking element is positioned within the cavity near the braking mechanism and produces a magnetic field oriented such that the field resists the rotation of the rotor of the braking mechanism in a first direction.

11. The apparatus of claim 10, wherein the magnetic braking element is configured to adjust the strength, position relative to the braking mechanism and/or orientation of the magnetic field produced by the magnetic field generator based on received control signals.

12. A brake dust collector for coupling with a braking mechanism of a vehicle having a front and rear collecting brake dust caused by braking the vehicle, the brake dust collector comprising:
a shroud having a hollow body that forms a cavity and surround the brake mechanism within the cavity, the hollow body having a shroud inlet aperture and a shroud outlet aperture with an air path between the shroud inlet aperture and the shroud outlet aperture, wherein the shroud inlet aperture faces the front of the vehicle, and further wherein the shroud inlet aperture is fully bounded by a first portion of the hollow body and the shroud outlet aperture is fully bounded by a second portion of the hollow body separate from the first portion; and
a catch canister coupled with the shroud, wherein the brake dust separates from the air path between the shroud inlet aperture and the shroud outlet aperture and is caught by the catch canister.

13. The collector of claim 12, wherein the cavity is structured to fit around a rotor of the braking mechanism and the shroud comprises one or more caliper apertures and one or more hub apertures sized to receive a caliper and a hub of the braking mechanism.

14. The collector of claim 12, wherein inner walls of the shroud forming the cavity comprise air fins that guide the air along a desired route.

15. The collector of claim 12, wherein the shroud inlet aperture is positioned nearby the hollow catch canister.

16. The collector of claim 12, wherein a flow of the brake dust is directed to the catch canister.

17. The collector of claim 12, further comprising an electrostatic precipitator having one or more plates, one or more electrodes and a power source that maintains a voltage difference between the plates and the electrodes.

18. The collector of claim 17, wherein the electrostatic precipitator is positioned within the cavity of the shroud such that the electrodes are between the plates and the shroud inlet aperture.

19. The collector of claim 18, wherein the catch canister is positioned nearby the plates to catch brake dust that falls off the plates.

20. The collector of claim 12, further comprising a magnetic braking element having a magnetic field generator, wherein the magnetic braking element is positioned within the cavity near the braking mechanism and produces a magnetic field oriented such that the field resists the rotation of a rotor of the braking mechanism.

21. The collector of claim 20, wherein the magnetic braking element is configured to adjust the strength, position relative to the braking mechanism and/or orientation of the magnetic field produced by the magnetic field generator based on received control signals.

22. A method of providing a braking apparatus to a vehicle having a braking mechanism, a front and a rear, the method comprising:
coupling a shroud with a braking mechanism having one or more brake pads by surrounding the braking mechanism with the shroud such that the braking mechanism is within a cavity formed by a hollow body of the shroud, wherein the hollow body has a shroud inlet aperture and a shroud outlet aperture with an air path between the shroud inlet aperture and the shroud outlet aperture, wherein the shroud inlet aperture faces the front of the vehicle, and further wherein the shroud inlet aperture is fully bounded by a first portion of the hollow body and the shroud outlet aperture is fully bounded by a second portion of the hollow body separate from the first portion; and
coupling a catch canister with the shroud, wherein the brake dust separates from the air path between the shroud inlet aperture and the shroud outlet aperture and is caught by the catch canister.

23. The method of claim 22, wherein the braking mechanism comprises one or more calipers, a rotor and a hub, wherein the calipers are fixedly coupled with the shroud whereas the rotor and hub are both rotatably coupled with the shroud such that the rotor and the hub are able to rotate with respect with the shroud.

24. The method of claim 23, wherein the cavity is structured to fit around the rotor of the braking mechanism and the shroud comprises one or more caliper apertures and one or more hub apertures sized to receive the calipers and the hub of the braking mechanism.

25. The method of claim 22, wherein inner walls of the shroud forming the cavity comprise air fins that guide the air along a desired route.

26. The method of claim 22, wherein the shroud inlet aperture is positioned nearby the catch canister.

27. The method of claim 22, wherein a flow of the brake dust is directed to the catch canister.

28. The method of claim 22, further comprising coupling an electrostatic precipitator with the shroud, wherein the electrostatic precipitator has one or more plates, one or more electrodes and a power source that maintains a voltage difference between the plates and the electrodes.

29. The method of claim 28, wherein the electrostatic precipitator is positioned within the cavity of the shroud such that the electrodes are between the plates and the shroud inlet aperture.

30. The method of claim 29, wherein the catch canister is positioned nearby the plates to catch brake dust that falls off the plates.

31. The method of claim 23, further comprising coupling a magnetic braking element with the shroud, wherein the magnetic braking element has a magnetic field generator and is positioned within the cavity near the braking mechanism, and further wherein the magnetic field generator produces a magnetic field oriented such that the field resists the rotation of the rotor of the braking mechanism in a first direction.

32. The method of claim 31, wherein the magnetic braking element is configured to adjust the strength, position relative to the braking mechanism and/or orientation of the magnetic field produced by the magnetic field generator based on received control signals.

33. The apparatus of claim 1, wherein the catch canister further comprises an air filter.

34. The collector of claim 12, wherein the catch canister further comprises an air filter.

35. The method of claim 22, wherein the catch canister further comprises an air filter.

* * * * *